United States Patent [19]
Luckhardt et al.

[11] Patent Number: 5,566,446
[45] Date of Patent: Oct. 22, 1996

[54] FEED DEVICE FOR FEEDING OF ASSEMBLY PARTS

[75] Inventors: Wolfgang Luckhardt, Königstein; Heinrich Luckhardt, deceased, late of Frankfurt Main, both of Germany, by Wolfgang Luckhardt, legal representative

[73] Assignee: Multifastener Corporation, Detroit, Mich.

[21] Appl. No.: 307,850

[22] PCT Filed: Apr. 2, 1993

[86] PCT No.: PCT/EP93/00835

§ 371 Date: Mar. 1, 1995

§ 102(e) Date: Mar. 1, 1995

[87] PCT Pub. No.: WO93/19889

PCT Pub. Date: Oct. 14, 1993

[30] Foreign Application Priority Data

Apr. 3, 1992 [DE] Germany .................... 42 11 278.8

[51] Int. Cl.⁶ ..................................... B23P 19/00
[52] U.S. Cl. ................... 29/798; 29/816; 227/120
[58] Field of Search .................... 29/798, 715, 716, 29/816, 818, 812.5, 822, 282, 283; 227/100, 120, 126

[56] References Cited

U.S. PATENT DOCUMENTS

| | | | |
|---|---|---|---|
| 2,574,811 | 11/1951 | Blumensaadt | 29/818 |
| 3,108,368 | 10/1963 | Steward | 29/798 X |
| 3,810,290 | 5/1974 | Grube | 29/798 X |
| 3,971,116 | 7/1976 | Goodsmith et al. | 29/798 |
| 4,384,667 | 5/1983 | Smallegan et al. | 29/798 X |

FOREIGN PATENT DOCUMENTS 1374186  11/1974  United Kingdom .................... 29/798

*Primary Examiner*—Peter Vo
*Assistant Examiner*—Khan V. Nguyen
*Attorney, Agent, or Firm*—Howard & Howard

[57] ABSTRACT

The invention describes a feed device that feeds assembly parts such as nuts, bolts, and rivets, from a sorting unit to the feed channel of a processing device for pressing or mounting of assembly parts to sheet metal. The feed device consists of a nozzle with a nozzle channel through it connected on one end to a feed line coming from the sorting unit. A protrusion of the nozzle can deploy into a recess opening of a guide piece of the processing device so that the nozzle channel will open laterally into the feed channel of the device. To connect the nozzle to the guide piece, two levers linked to the nozzle are used; they are pretensioned by springs in a closed position surrounding the guide piece and can be moved manually, possibly with the assistance of a tool, into an open position. In this manner the feed device can be easily connected to the processing device and then detached from it.

22 Claims, 4 Drawing Sheets

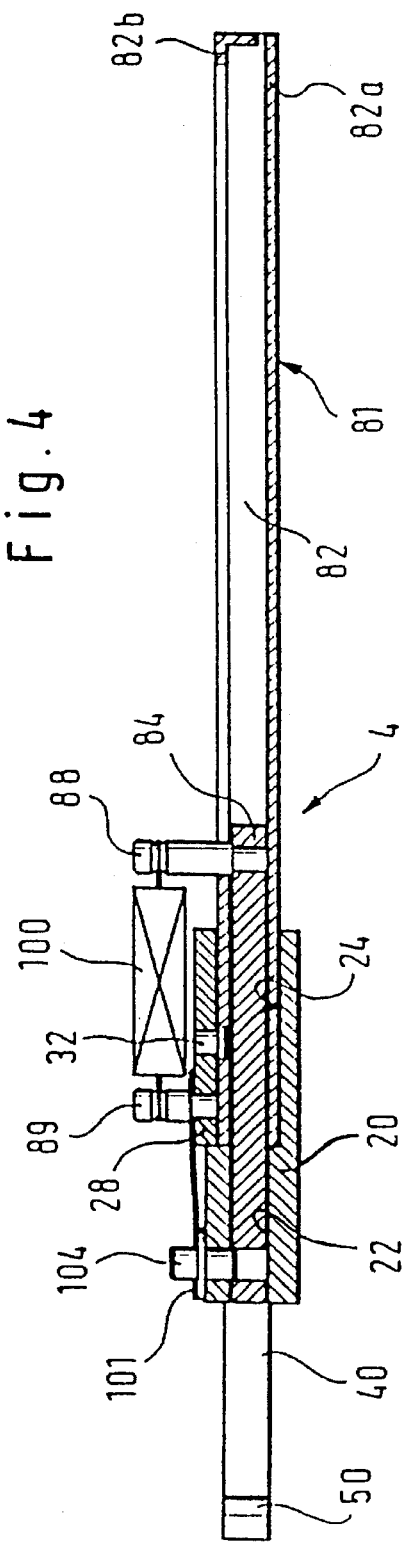
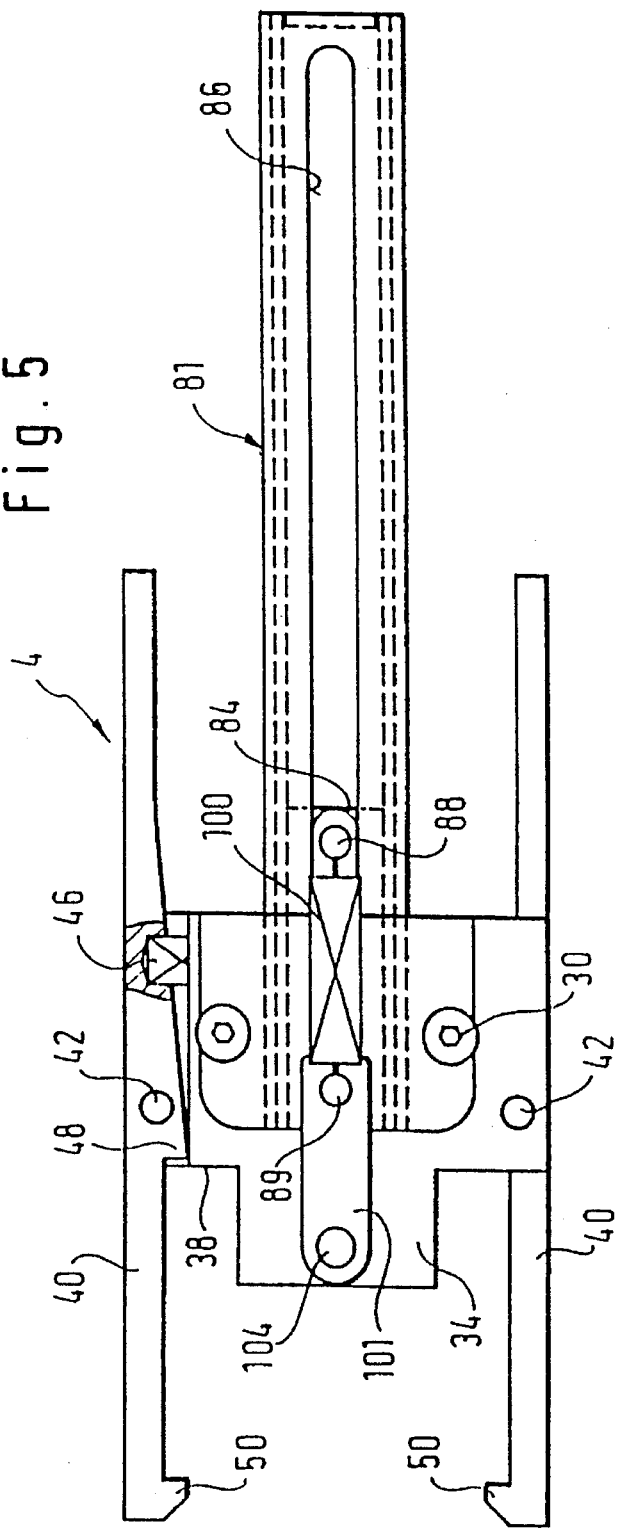

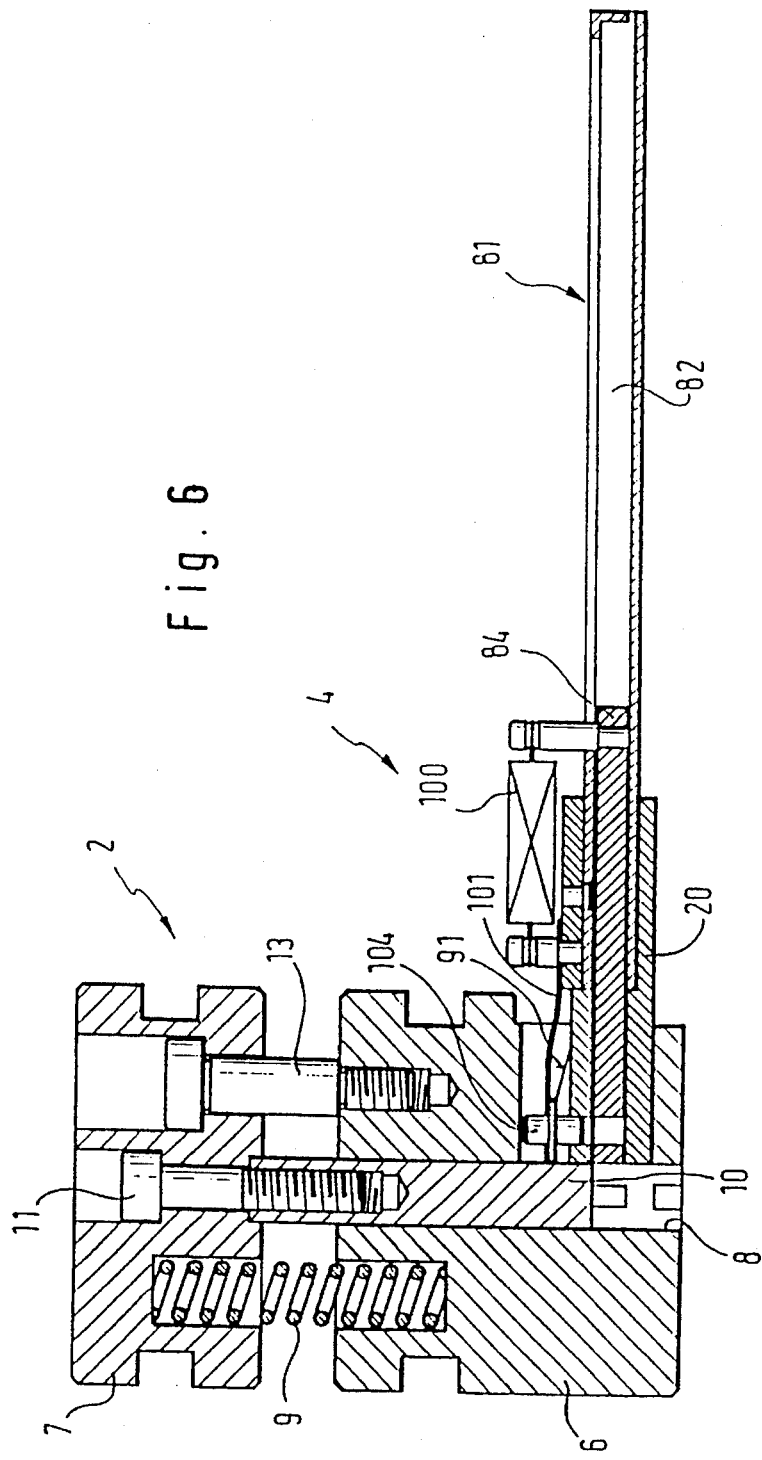
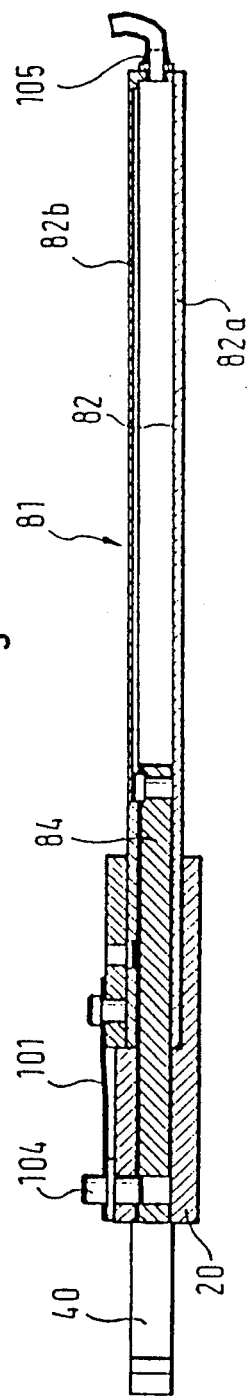

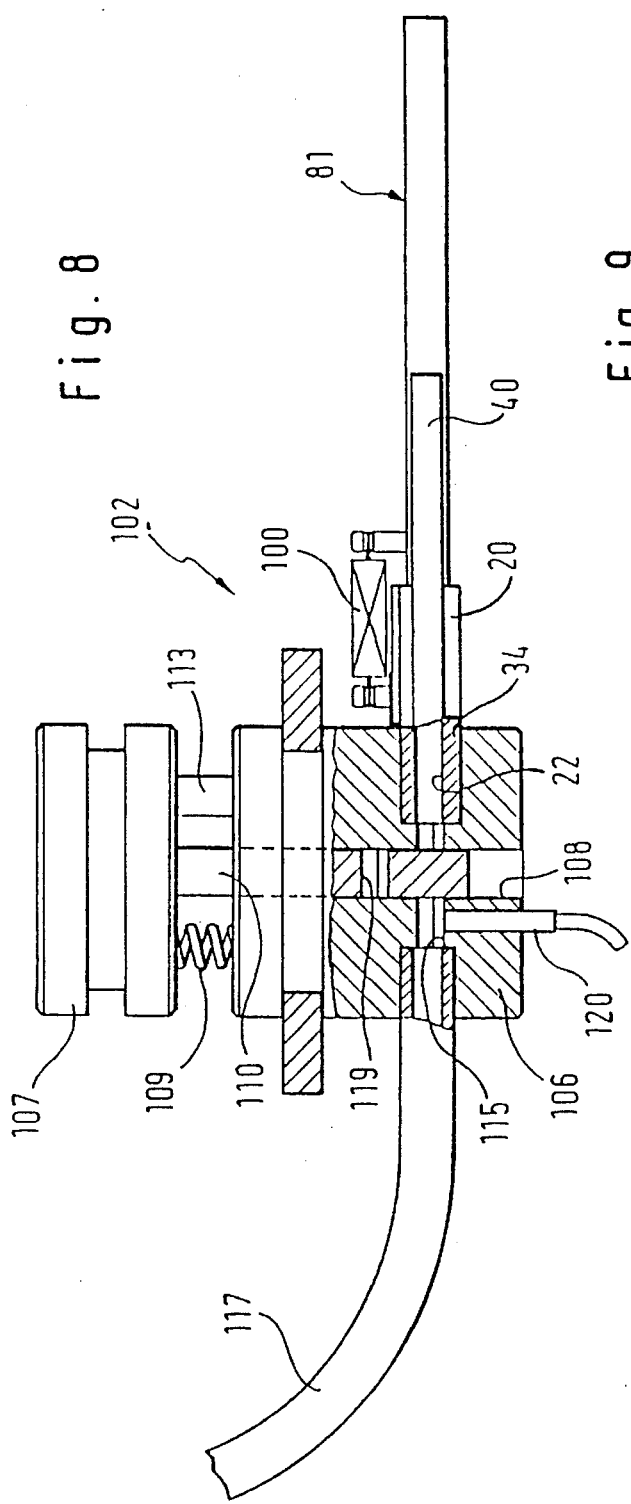
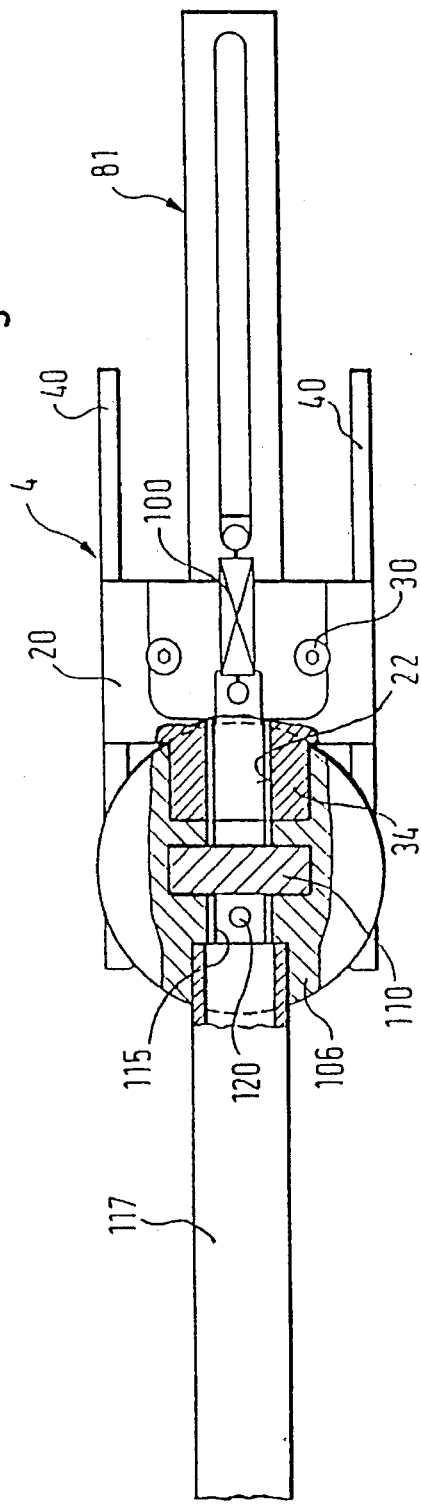

5,566,446

FEED DEVICE FOR FEEDING OF ASSEMBLY PARTS

BACKGROUND OF THE INVENTION

The invention pertains to a feed device for feeding assembly parts, in particular nuts or other elements, to a feed channel of a processing device.

Processing devices of this type pertain primarily to punching mechanisms used to press nuts or other assembly parts into sheet metal. The feed channel is usually formed in a guide piece that is flexibly braced against the upper press part so that during a downward movement of the upper press part, a plunger will drive one nut through the feed channel.

The nuts are transported by a sorting unit through a preferably flexible feed line (e.g., hose) to the punching mechanism. The transfer of nuts from the end of the feed line to the feed channel is performed by the feed device which must be connected to the guide piece of the punching mechanism for this purpose. This has been done for example, by screwing the nozzle of the feed device to the guide piece of the punching mechanism. Connection and disconnection of the feed device are therefore cumbersome and comparatively time-consuming. In addition, the known feed devices are frequently of complicated design, expensive to manufacture and break down easily.

BRIEF SUMMARY OF THE INVENTION

The invention provides a feed device that will allow a fast and simple connection and disconnection together with a simple design.

The problems encountered in previous systems are solved by the present invention. Briefly, the preferred embodiment of the present invention has two levers that are linked to opposing sides of a nozzle, The levers are pretensioned by springs to a normally closed position for connecting the nozzle to a guide piece. The levers can be pivoted manually to an open position to release the nozzle from the guide piece.

In the feed device designed according to this invention, the two levers coupled to the nozzle provide the connection with the guide piece. Therefore the connection and disconnection merely require that the two levers be pivoted between their closed and open positions. This can be done manually very quickly and easily. Clamping or release of screws or similar attachment elements is not necessary. The simple connection and disconnection are achieved by a comparatively low level of design and manufacturing effort. At the same time, a precise control of the elements between the feed line and the feed channel is assured. Moreover, the invention is distinguished by operating reliability and having a long service life.

The feed line can be designed as a hose leading to a sorting unit or to another source. Another possibility is to design the feed line as a magazine channel of a magazine attached to the nozzle, where the magazine holds a specific number of assembly parts. In this case a filling device can be provided that is connected to the nozzle of the feed device for filling the magazine.

According to another refinement of the invention, a locking mechanism is provided at the nozzle which locks the levers in their closed position when in the connected state. This provides additional security against accidental opening of the levers.

Other favorable embodiments of the invention are described in the Detailed Description of the Invention and the claims and are shown in the drawings, a brief description of which follows,

BRIEF DESCRIPTION OF THE DRAWINGS

FIG. 4 A longitudinal cross section through another application example of a feed device which is equipped with a magazine for nuts;

FIG. 5 A plan view of the feed device of FIG. 4;

FIG. 6 A longitudinal cross section through the feed device of FIGS. 4 and 5 and a punching mechanism with connected feed device;

FIG. 7 A longitudinal cross section corresponding to FIG. 4 through a modified design of the feed device according to FIGS. 4,5;

FIG. 8 A partially cutaway side view of a filling device for filling the magazine of the feed device according to FIGS. 4,5;

FIG. 9 A partially cutaway plan view of the filling device according to FIG. 8.

DETAILED DESCRIPTION OF THE INVENTION

Figure 1:
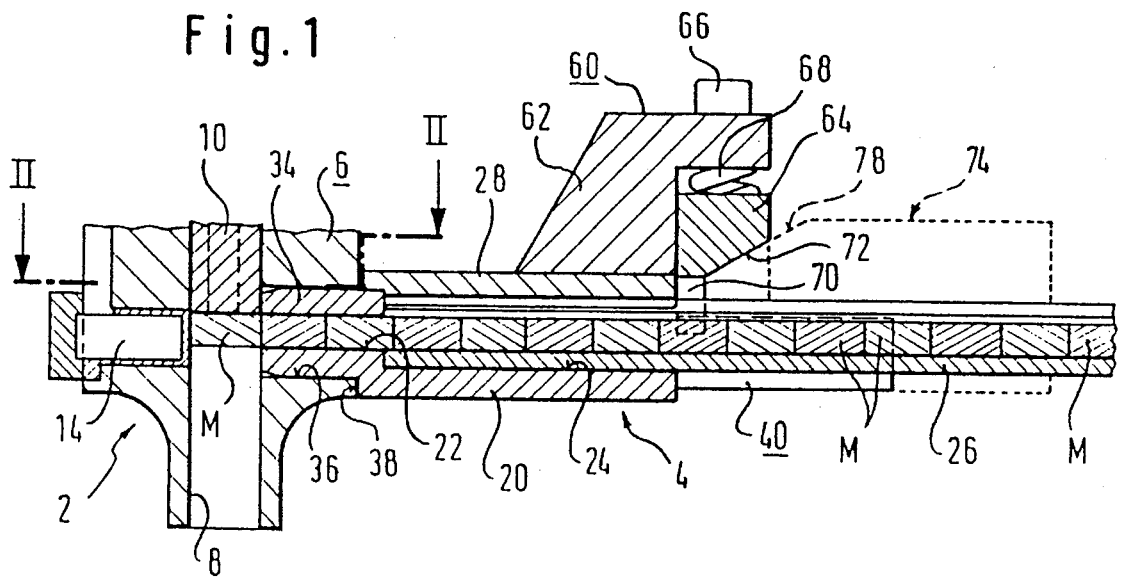
FIG. 1 A longitudinal cross section through a feed device connected to a guide piece of a punching mechanism.
Figure 2:
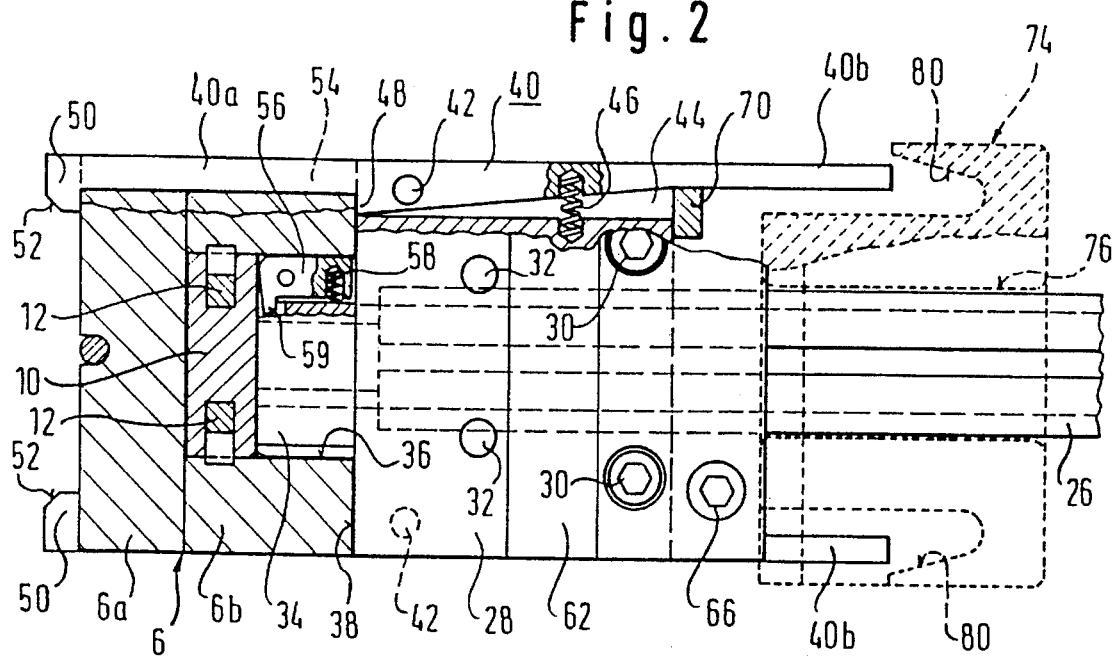
FIG. 2 A cross section viewed in the direction of arrow II in FIG. 1.

The left portion of FIGS. 1 and 2 shows part of a processing device in the form of a punching mechanism or installation head 2 that is used for pressing nuts M into a piece of sheet metal (not shown). The nuts M are fed by a sorting unit (not shown) through the feed device 4 by means of a flexible or solid feed line 26 designed, for example, as a hose.

The punching mechanism 2 features a two-part 6a,b guide piece 6 that is flexibly braced against an upper press part (not shown) that moves up and down; this press is also provided with a feed channel 8. A sliding plunger 10 in the feed channel 8 is used to drive a nut M through the feed channel 8 during a downward movement of the upper press part and to press it into the sheet metal (not shown). During the downward movement of the plunger 10, the nut M is held in position by two retaining catches 12 indicated in FIG. 2. Furthermore, FIG. 1 shows a sensor device 14 which determines the presence of a nut M. The remaining design of the punching device 2 is irrelevant for understanding the present application and will not be described further.

The feed device 4 consists of a nozzle 20 in the form of a plate-like component which is equipped with a nozzle channel 22 going through it for the nuts M. The nozzle channel 22 features a region 24 of expanded cross section which holds one end section of the feed line 26 coming from the sorting unit.

In the portion of the nozzle 20 including region 24 with the expanded cross section, there is an open upper side that is sealed off by a clamp plate 28. The clamp plate 28 is attached to the nozzle 20 by two screws 30 and is used to hold the feed line 26 securely in the nozzle 20 in a vertical direction. The feed line 26 is held in the horizontal direction by two cylindrical pins 32.

The nozzle 20 is provided with a protrusion 34 on its end turned away from the feed line 26; this protrusion can be inserted into an appropriately shaped recess opening 36 of the guide piece 6 to make the connection. The exact positioning of the nozzle 20 relative to the guide piece 6 is achieved by contact of the protrusion 34 with the wall surfaces of the recess opening 36 and by contact of the front surface 38 of the nozzle 20 adjoining the protrusion 34 with the guide piece 6. In this case the protrusion 34 extends up to the corresponding side surface of the feed channel 8, so that the nozzle-channel 22 opens directly into the feed channel 8. In this manner, a reliable transport of nuts M from the feed line 26 to the feed channel is assured.

To connect the nozzle 20 to the guide piece 6, two levers 40 are used; they are pivotably mounted by bolts 42 in lateral recesses 44 of the nozzle 20. Each lever 40 consists of one retaining arm 40a and one actuator arm 40b. The levers 40 are tensioned in the direction of a closed position by a spring 46 that acts between the actuator arm 40b and the nozzle 20.

Protrusions 48 are formed on the retaining arms 40a that are pressed against the contact surfaces into the recesses 44 by the pretension of the springs 46 when in the disconnected state holding the levers 40 in a spread position. In the connected state (FIG. 2), the retaining arms 40a are pressed by the force of the springs 46 into lateral grooves 54 of the guide piece 6. In this case the retaining arms 40a have hook-like ends 50 that surround the guide piece 6 so that the levers 40 hold the nozzle 20 against the guide piece 6 with an interlocking connection. The hook-like ends 50 are provided with slants 52 on their mutually facing sides; these slants make it easy to push the retaining arms 40a into the grooves 54 of the guide piece 6.

A catch 56 is pivotably mounted in the protrusion 34 of the nozzle 20. The catch 56 is under the effect of a spring 58. If the nozzle 20 is disconnected, then the spring 58 presses the catch 56 into a blocked position in which the catch peak 59 blocks the nozzle channel 22 so that the nuts M located in the nozzle channel 22 cannot slip out. If the protrusion 34 of the nozzle 20 is pushed into the receiving opening 36, then due to contact with one wall of the receiving opening 36, the catch 56 will pivot back independently into a position in which it releases the nozzle channel 22 (FIG. 2). In the region of the catch peak 59 the nozzle channel 22 is provided with recesses 57 adapted to the cross-sectional shape of the nut M (FIG. 3), these recesses ensuring a precise control of the nut M in this area.

The nozzle 20 can be optionally equipped with a locking mechanism 60 for the two levers 40. The locking mechanism 60 features a support 62 that is attached to the nozzle 20 by the recessed screws 30 in the support 62.

A locking element 64 can slide vertically along one contact surface of the support 62. The locking element 64 is tensioned downward in a locked position by a spring 68 braced against a lateral flange of the support 62. It is held in this position by a screw 66 screwed into the locking element 64 and extending through a hole drilled in the lateral flange of the support 62, whose head is braced against the upper side of the support 62.

Figure 3:
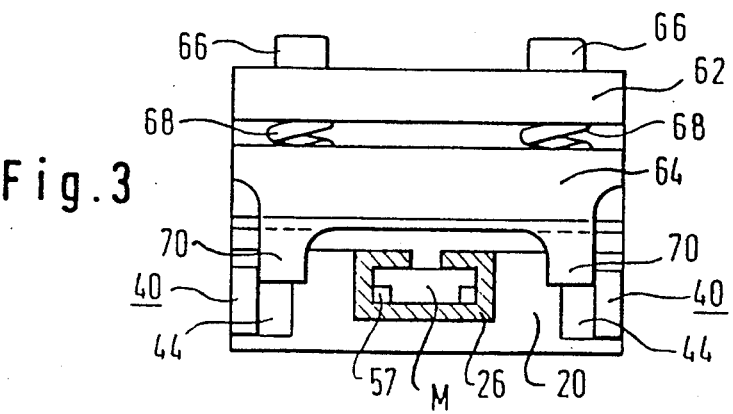
FIG. 3 An end view of the feed device of FIGS. 1 and 2, viewed from the right side in FIGS. 1,2.

The locking element 64 is provided with two lateral locking protrusions 70 (see esp. FIG. 3) that extend between the two actuator arms 40b of the levers 40 in the locked position and thus prevent the actuator arms 40b from pivoting inward. The levers 40 are thus locked in their closed position and can only be opened after an upward movement of the locking element 64 into an unlocked position.

The operation of the feed device 4 is probably already mostly evident from the above description. To make the connection, the nozzle 20 with attached feed line 26 is moved up to the guide piece 6 of the punching mechanism so that the retaining arms 40a with their hook-like ends 50 engage in the grooves 54, and the protrusion 34 engages in the recess opening 36. If the feed device 4 is equipped with a locking mechanism 60, as shown, then first the locking mechanism 60 must be unlocked by pushing up the locking element 64 so that the actuator arms 40b can pivot inward. When pushing the protrusion 34 into the recess opening 36, the catch 56 will pivot into the release position due to contact with the side wall of the recessed opening 36 so that the nozzle channel 22 will be released.

As soon as front face 38 of the nozzle 20 touches the guide piece 6, the springs 46 will pivot the retaining arms 40a inward into the closed position where they will engage in the grooves 54 of the guide piece 6 and the hook-like ends 50 will surround the guide piece 6. The locking element 64 will be pressed by the springs 68 downward into its locked position where the locking protrusions 70 move between the actuator arms 40b so that the levers 40 are locked in their closed position.

Now the nozzle 20 is securely attached to the guide piece 6 so that the nuts M can move through the nozzle channel 22 to the feed channel 8.

To detach the nozzle 20 from the guide piece 6, first the locking element 64 is pushed upward into its unlocked position against the force of the springs 68. Next, the levers 40 are pivoted into their open position by inward pivoting of the actuator arms 40b so that now the nozzle 20 can be withdrawn from the guide piece 6. When the nozzle 20 is withdrawn from the guide piece 6, the catch 56 will be pressed by the spring 58 back into its locked position to prevent the nuts from slipping out of the nozzle channel 22. The protrusions 48 on the retaining arms 40a of the levers 40 are pressed by the springs 46 into contact with the contact surfaces in the recesses 44 of the nozzle 20. The feed device is then ready for a new connection process.

To connect and disconnect the nozzle 20, an auxiliary tool 74 can be used that is shown by dashed lines in FIGS. 1 and 2. The auxiliary tool 74 is designed as a block device that is provided on its underside with a recess 76 corresponding to the feed line 26, so that the auxiliary tool 74 can be pushed onto the feed line 26 in a longitudinal direction.

On its front side the auxiliary tool 74 has a ramp surface 78 that cooperates with a corresponding ramp surface 72 of the locking element 64. Furthermore, there are two additional ramp surfaces 80 on two lateral arms of the auxiliary tool 74 that cooperate with the two levers 40.

The auxiliary tool 74 can be equipped with a relatively long handle (not illustrated) so that connection and disconnection of the feed device can be carried out from a relatively large distance, which is important especially with respect to safety considerations.

As is readily evident, the ramp surfaces 78 and 80 provide the combined actuator movement necessary for sliding the locking element 64 and for pivoting the levers 40, both during connection and also during disconnection. It is necessary merely to slide the auxiliary tool 74 along the feed line 26 in the direction of the nozzle 20.

Obviously also the feed device 4 can be used not only for feeding of polygonal nuts, but also for round nuts or even other elements, such as bolts, rivets, etc.

FIGS. 4 and 5 show a modified application example of a feed device. The same reference numbers are used where the application example of FIGS. 4 and 5 correspond to the previous figures.

The feed device of FIGS. 4 and 5 differs from the feed device of FIGS. 1–3 in that the feed line for feeding the nuts or other assembly parts is not designed as a feed hose leading to a sorting unit, but rather it is designed as a magazine 81 that holds a specified number of nuts (or other assembly parts).

The magazine 81 features a magazine channel 82 that is formed by a lower magazine part 82a and an upper magazine part 82b. The two parts of the magazine 81 extend into the region 24 of the nozzle 20 having an expanded cross section, and they are held in place there by the clamp plate 28 and the pin 32. A slide 84 can move longitudinally within the magazine channel 82.

In the application example of FIGS. 4 and 5, the slide 84 is held under tension by a tension spring 100 in a direction such that it will drive the nuts stored in the magazine channel 82 in the direction of the outlet end of the protrusion 34 of the nozzle 20. One side of the tension spring 100 is mounted to a pin 89 attached to the nozzle, and the other side to a pin 88 attached to the slide 84; the latter pin extends through a longitudinally running lead 86 in the upper part 82 of the magazine.

To prevent the nuts from falling out of the nozzle channel 22 and thus out of the magazine 81 when the feed device 4 is in the disconnected state, a lock is provided in the form of a bolt 104 that is pretensioned in a position blocking the nozzle channel 22 by means of a leaf spring 101 attached to the feed device, and during connection, it is automatically pressed into a release position.

The feed device shown in FIGS. 4 and 5 is not dependent on a feed hose for the feeding of nuts, and therefore it can be connected to a "mobile" processing device, which in turn can be used with a moving machine part. FIG. 6 shows this type of application, where the feed device 4 of FIGS. 4 and 5 is connected to a punching mechanism 2 designed as a mobile unit.

The punching mechanism 2 features a guide piece 6 in the form of a lower housing part that is braced elastically by springs 9 against an upper housing part 7. The plunger 10 used for punching the nuts is held in place by a screw 11 in the upper housing part 2 and extends into the feed channel 8 of the guide piece 6.

As is evident in FIG. 6, the feed device 4 is connected to the punching mechanism 2 in principle in the same way as the feed device of FIGS. 1 to 3. The magazine 81 in the disconnected state is filled with a specified number of nuts (or example, ten nuts), so that the slide 84 moves from the far left position shown in FIG. 6, to far right position, where the nuts are prevented from falling out by the bolt 89. When connecting the feed device 4 to the punching mechanism 2, the bolt 89 will move into its release position due to the slanted surface 91. The slide 84 pretensioned by the spring 100 can then feed the nuts one after the other to the feed channel 8, where the nuts are driven out downward by the plunger 10 due to the relative movement between the upper and lower housing parts 7,6.

Whereas the slide 84 is driven by spring force in the application example of FIGS. 4 to 6, in the application example of FIG. 7 the pretensioning force on the slide 84 is produced by compressed air. In this case, a compressed air fitting 105 is provided at the rear end of the fluid-tight magazine channel 82; this fitting leads to a hose and then to a compressed air source. The hose connection can be run to a compressed air coupling (not shown) provided on the nozzle 20 that will automatically establish a connection to the compressed air source when connecting the feed device to the punching mechanism 2.

When filling the magazine 81, a filling device 102 can be used, as is illustrated in FIGS. 8 and 9. The filling device 102 has a similar design to the punching mechanism 2 in FIG. 6. It features a lower housing part 106 and an upper housing part 107, which are elastically braced against each other by springs 109 and have a lift limiter in the form of screws 113. A plunger 110 attached to the upper housing part 107 extends into a guide channel 108 in the lower housing part 106.

In addition, a transverse passageway channel 115 is provided in the lower housing part 106. On its left end (in FIGS. 8 and 9) a feed hose 117 is attached that leads for instance, to a sorting unit or to another device for output of nuts. Similar to the punching mechanism 2 in FIG. 6, the feed device 4 can be connected to the magazine 81 at the fill device 102, so that the right end of the passageway channel 115 is connected to the nozzle channel 22 at the protrusion 34 of the nozzle 20.

As shown in FIG. 8, the plunger 110 normally assumes a position in which it blocks the passageway channel 115, so that the nuts cannot slip out of the feed hose 117. Due to a relative movement between the lower and upper housing parts 106,107, the plunger 110 is driven into a position where a lead 119 of the plunger 110 aligns with the passageway channel 115. The width of the lead 119 corresponds to that of the nuts. The nuts can then be moved from the feed hose 117 through the nozzle channel 22 into the magazine 81.

If the magazine 81 is operated by spring force as in FIGS. 4–6 and 8–9, then the feed force (e.g., gravity) moving the nuts through the feed hose 117 must be great enough to overcome the spring force of the magazine 81. In the application example of FIG. 7 where the magazine 81 is operated pneumatically, the configuration is set up so that the slide 84 is not affected by compressed air when filling, so that only a correspondingly small feed force is needed to feed in the nuts.

As shown in FIG. 8, the fill device 102 is provided with a sensor unit 120 that monitors the feeding of nuts through the feed hose 117 (e.g., it counts the number of fed nuts) and once the magazine 81 is filled, it outputs a signal that moves the plunger 110 (by an unillustrated control unit) into its position blocking the passageway channel 115.

It is claimed:

1. A feeding device for feeding fasteners from a supply of fasteners to an installation head, said feeding device comprising:

a nozzle connected to said supply of fasteners, said nozzle having a free end which is adapted to be connected to said installation head, and a continuous channel for the movement of said fasteners from said supply of fasteners to said installation head;

a coupling device for positively coupling said nozzle to said installation head; said coupling device includes at least one lever mounted on opposed sides of said nozzle with each of said at least one lever being mounted to pivot between a connection position and a released position; and a movable catch mechanism having a first position wherein said catch intersects said channel to block said fasteners from moving through said nozzle, and a second position wherein said catch es removed from said channel permitting passage of said fasteners through said channel;

biasing means for biasing said movable catch to said first position to normally block said fasteners from moving through said mouthpiece, said catch being urged to said second position against said biasing means as said nozzle is connected to said installation head to permit passage of said fasteners through said channel into said installation head;

whereby said supply of fasteners can be interconnected to said installation head by coupling said nozzle to said installation head such that said supply of fasteners is automatically stopped when said nozzle is decoupled from said installation head and is automatically opened when said nozzle is coupled to said installation head.

2. The feeding device of claim 1, wherein said free end of said nozzle includes a projection adapted to be inserted into a mating receptacle opening of the installation head to facilitate the coupling of the feeding device to the installation head.

3. The feeding device of claim 2, wherein said channel extends through the projection and laterally intersects a feed path extending within said installation head.

4. The feeding device of claim 1, further including a guide element mounted to said installation head, said guide element defining an opening for receipt of the free end of said nozzle, said free end including a projection adapted to be inserted into said opening to facilitate the coupling of the feeding device to the installation head.

5. The feeding device of claim 4, further including a locking mechanism for locking said nozzle into said installation head by locking said at least one lever into said connection position; whereby said lock locks the lever in a coupled condition.

6. The feeding device of claim 5, wherein said locking mechanism includes a receptacle block attached to the nozzle and a stop element attached in a movable manner on the receptacle block, said stop element is biased into a locking position in which it prevents actuation of said lever by blocking movement of said lever, said stop element being manually movable to a release position.

7. The feeding device of claim 6, further including an auxiliary tool having a slanted surface for disengaging said lock, said slanted surface being adapted to interact with a corresponding angled surface located on said stop element to displace the stop element.

8. The feeding device according to claim 7, wherein the auxiliary tool has additional slanted surfaces which actuate the coupling device into the release position during a displacement of the auxiliary tool to disengage the nozzle from the installation head.

9. The feeding device of claim 1, wherein said at least one lever has opposed ends and is mounted for pivotal movement about an axis positioned between the opposed ends of each of said levers, said axis defining two sections of said lever, one of which serves as a holding section and the other one of which serves as an actuation section.

10. The feeding device of claim 9, further including a spring mounted between the actuation section and the nozzle.

11. The feeding device of claim 1, further including a feed line extending from said supply of fasteners and connected to said nozzle.

12. The feeding device of claim 1, wherein said catch mechanism is pivotally mounted to a projection and is adapted to pivot from said first position to said second position as a projection is inserted into said opening thereby opening said channel for the movement of fasteners into said installation head, said catch pivoting into said channel upon removal of said projection from said opening to prevent said fasteners from exiting said nozzle.

13. The feeding device of claim 12, wherein said catch mechanism includes at least one arm pivotally mounted to said projection, said opening being defined by a wall surface, said arm engaging said wall surface to pivot to said second position.

14. The feeding device of claim 1, wherein said catch is automatically biased into said channel in the first position to block the fasteners from exiting said nozzle when said nozzle in a decoupled condition, and said catch is pressed into said second position in a coupled condition;

whereby the flow of said fasteners from said supply of fasteners is automatically stopped when said nozzle is decoupled from said installation head and is automatically opened when said nozzle is coupled to said installation head.

15. The feeding device of claim 1, further including a fastener drive mechanism operatively associated with said feeding device.

16. The feeding device of claim 1, further including a fastener magazine interconnected to said feeding device.

17. A feeding device for feeding fasteners from a supply of fasteners to an installation head, said feeding device comprising:

a nozzle connected to said supply of fasteners, said nozzle having a free end which is adapted to be connected to said installation head, and a continuous channel for the movement of said fasteners from said supply of fasteners to said installation head;

a coupling device for positively coupling said nozzle to said installation head;

a movable catch mechanism having a first position wherein said catch intersects said channel to block said fasteners from moving through said nozzle, and a second position wherein said catch is removed from said channel permitting passage of said fasteners through said channel, said catch is pivotably mounted to said nozzle and is adapted to pivot from said first position to said second position as said nozzle is inserted into an opening of said coupling device thereby opening said channel for the movement of fasteners into said installation head, said catch pivoting into said channel upon removal of said nozzle from said opening to prevent said fasteners from exiting said nozzle;

biasing means for biasing said catch to said first position to normally block said fasteners from moving through said mouthpiece, said catch being urged to said second position against said biasing means as said nozzle is connected to said installation head to permit passage of said fasteners through said channel into said installation head;

whereby said supply of fasteners can be interconnected to said installation head by coupling said nozzle to said installation head such that said supply of fasteners is automatically stopped when said nozzle is decoupled from said installation head and is automatically opened when said nozzle is coupled to said installation head.

18. The feeding device of claim 17, wherein said catch mechanism includes at least one arm biased to said first position; said lever engaging said installation head as said is nozzle coupled to said installation head and moving to said second position.

19. A feeding device for feeding fasteners from a supply of fasteners to an installation head, said feeding device comprising:

a nozzle connected to said supply of fasteners, said nozzle having a free end which is adapted to be connected to said installation head, and a continuous channel for the movement of said fasteners from said supply of fasteners to said installation head;

a coupling device for positively coupling said nozzle to said installation head, said coupling device includes at least one lever mounted longitudinally along the side of said nozzle and adapted to fit within a mating groove formed in a guide element mounted to said installation head, said guide element defining an opening for receipt of the free end of said nozzle, said free end including a projection adapted to be inserted into said opening to facilitate the coupling of the feeding device into the installation head, said at least one lever having a closed position wherein said lever is adapted to positively contact said nozzle to said installation head and a release position where in said lever is adapted to release said nozzle from said installation head;

a movable catch mechanism having a first position wherein said catch intersects said channel to block said fasteners from moving through said nozzle, and a second position wherein said catch is removed from said channel permitting passage of said fasteners through said channel;

biasing means for biasing said catch to said first position to normally block said fasteners from moving through said nozzle, said catch being urged to said second position against said biasing means as said nozzle is connected to said installation head to permit passage of said fasteners through said channel into said installation head;

a locking mechanism for locking said nozzle into said installation head by locking said at least one lever into said closed position to lock the lever in a coupled condition;

whereby said supply of fasteners can be interconnected to said installation head by coupling said nozzle to said installation head such that said supply of fasteners is automatically stopped when said nozzle is decoupled frown said installation head and is automatically opened when said nozzle is coupled to said installation head.

20. The feeding device of claim 19, wherein said locking mechanism includes a receptacle block attached to the nozzle and a stop element attached in a movable manner on the receptacle block, said stop element is biased into a locking position in which it prevents actuation of said lever by blocking movement of said lever, said stop element being manually movable to said release position.

21. The feeding device of claim 20, further including an axillary tool having a slanted surface for disengaging said lock, said slanted surface being adapted to interact with a corresponding angled surface located on said stop element to displace the stop element.

22. The feeding device of claim 21, wherein the auxiliary tool has additional slanted surfaces which actuate the coupling device into the release position during a displacement of the auxiliary tool to disengage the nozzle from the installation head.

* * * * *